H. F. A. KLEINSCHMIDT.
SPLICE BAR FOR ELECTRICALLY WELDED JOINTS.
APPLICATION FILED SEPT. 14, 1908.
991,726.
Patented May 9, 1911.
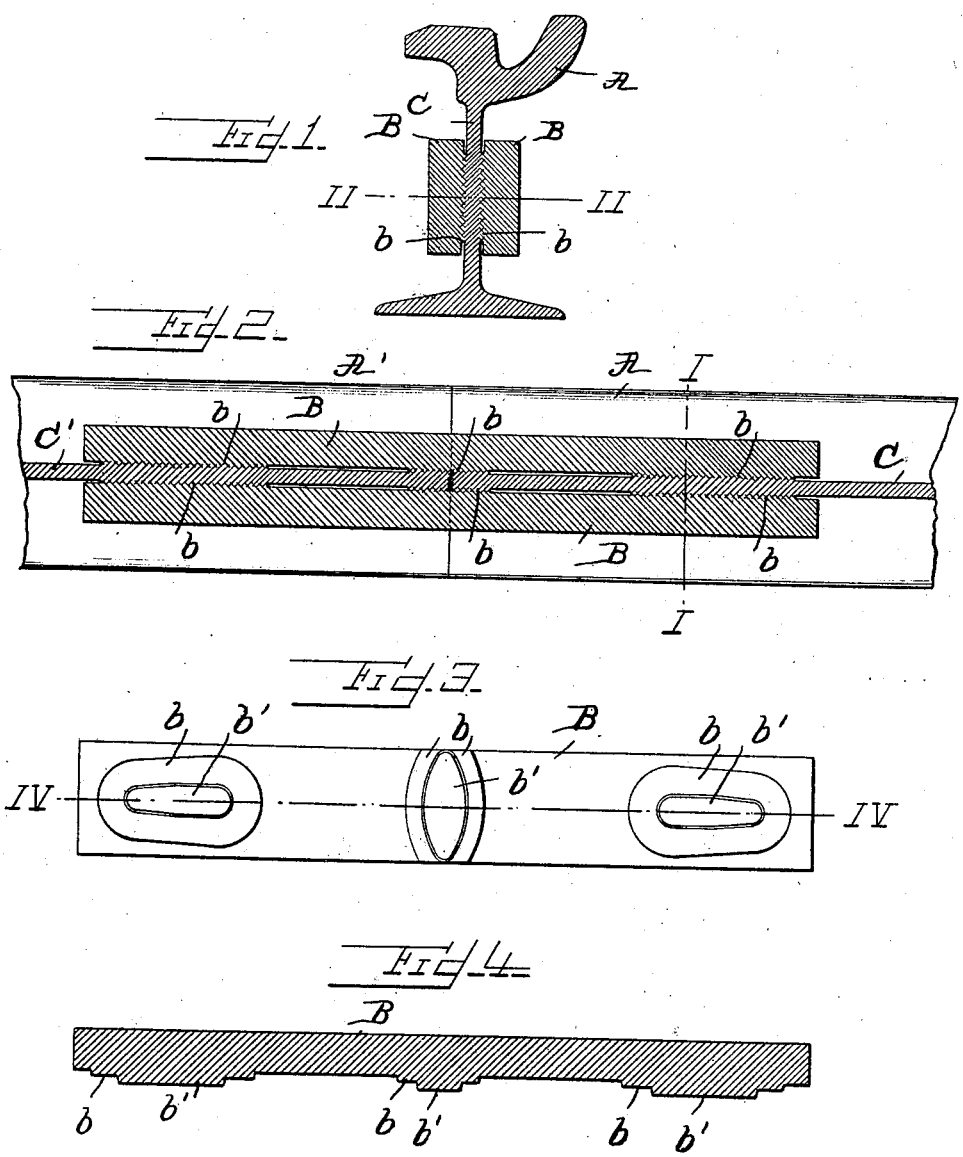
WITNESSES:
INVENTOR
H.F.A. Kleinschmidt,
BY
Jesse B. Heller
ATTORNEY.

UNITED STATES PATENT OFFICE.

HENRY F. A. KLEINSCHMIDT, OF JOHNSTOWN, PENNSYLVANIA, ASSIGNOR TO THE LORAIN STEEL COMPANY, A CORPORATION OF PENNSYLVANIA.

SPLICE-BAR FOR ELECTRICALLY-WELDED JOINTS.

991,726.  Specification of Letters Patent.  Patented May 9, 1911.

Application filed September 14, 1908. Serial No. 452,865.

*To all whom it may concern:*

Be it known that I, HENRY F. A. KLEIN-SCHMIDT, of Johnstown, in the county of Cambria and State of Pennsylvania, have invented a new and useful Improvement in Splice-Bars for Electrically-Welded Joints, of which the following is a full, clear, and exact description, reference being had to the accompanying drawings, which form a part of this specification.

My invention relates to a new and useful improvement in splice bars for electrically welded joints in which the two members in alinement with each other are to be held together by means of splice bars welded to the sides of these members.

My invention particularly relates to splice bars for electrically welded rail joints, which joints are used to make what is known to the art as a continuous rail, and is designed to provide a splice having means for insuring a uniform weld under varying conditions, such as unevenness of surface of the splice bars, or rails.

Referring to the accompanying drawings, Figure 1, is a vertical section on the line I—I of Fig. 2. Fig. 2 is a longitudinal section on the line II—II of Fig. 1. Fig. 3 is a side elevation of my improved splice bar. Fig. 4, is a sectional view on the line IV—IV of Fig. 3.

A and A', are two rail members which are held together by means of the splice bars B—B on each side of the webs C—C' of the respective rail members A—A'.

The splice bars B—B are each provided with the three series of projections $b$, $b'$. The projections $b'$ being considerably higher than the projections $b$, and as will be noted by reference to Fig. 3, the face thereof is considerably less in area.

The two members which are to be welded together, which in this case are shown to be two rail members, are placed in alinement with each other, and the splice bars are placed on each side of the webs of the rail members, and are held in position by any well known method. The projections $b'$ of the splice bars B, are held in contact with the webs of the rail. The usual welding current is then passed from splice bar to splice bar through the projections $b'$, and the web of the rail until it has been raised to what is known as the "welding heat," after which the proper pressure is applied, to form the weld, this pressure being sufficient to compress or to force the projections $b'$ into the webs of the rails, and form a perfect weld therewith. The projections $b$ will also contact with the webs and may also be forced into the webs, but not sufficiently to bring the body of the splice bar into contact with the webs.

The single projection on a splice bar is well known to the art, its disadvantage being that a predetermined amount of pressure is always applied to make the weld, while the area of the bar under pressure will vary, due to the uneven surface of the bars, which will present a surface of varying area under pressure, and make an unequal weld. In my improved joint, the area under pressure, which is the area of the projections $b$, is always constant. Therefore, each weld is made under the same conditions, as the pressure is always equal and the area under pressure is also constant.

Having thus described my invention, what I claim as new and desire to secure by Letters Patent is:—

1. A splice bar for electrically welded joints having projections forming contact faces each projection having a plurality of such contact faces arranged in different parallel planes; substantially as described.

2. A splice bar for electrically welded joints having a projection forming two contact faces, said faces being arranged in different parallel planes; substantially as described.

3. A splice bar for electrically welded joints having a plurality of projections forming contact faces, with a plurality of contact faces in different parallel planes on each of said projections; substantially as described.

4. A splice bar for electrically welded joints having at least two projections on one face thereof each projection having at least two contact faces thereon, said faces being arranged in different planes; substantially as described.

5. A splice bar for electrically welded joints having three projections on one face thereof, each of said projections having two parallel contact faces thereon disposed in different planes; substantially as described.

6. A splice bar for electrically welded joints having three projections on one face, each of said projections having a plurality of contact faces arranged in different planes; substantially as described.

7. A splice bar for electrically welded joints having three projections on one of the faces, the end projections having their greatest length in line with the splice bar and a central projection having its greatest length transversely of the splice bar, each of said projections having two surfaces of different heights from the face of the splice bar; substantially as described.

In testimony whereof, I have affixed my signature in presence of two witnesses.

H. F. A. KLEINSCHMIDT.

Witnesses:
    L. O'CONNELL,
    H. W. SMITH.